United States Patent
Muto et al.

(10) Patent No.: US 7,183,875 B2
(45) Date of Patent: Feb. 27, 2007

(54) HIGH FREQUENCY SWITCHING COMPONENT WITH ELECTROSTATIC SURGE ELIMINATION

(75) Inventors: Hideki Muto, Omihachiman (JP); Koji Tanaka, Shiga-ken (JP); Koji Furutani, Moriyama (JP); Takahiro Watanabe, Shiga-ken (JP); Takanori Uejima, Kusatsu (JP); Norio Nakajima, Takatsuki (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 430 days.

(21) Appl. No.: 10/698,427

(22) Filed: Nov. 3, 2003

(65) Prior Publication Data

US 2004/0092292 A1   May 13, 2004

Related U.S. Application Data

(63) Continuation of application No. 09/603,252, filed on Jun. 26, 2000, now Pat. No. 6,731,184.

(30) Foreign Application Priority Data

Jul. 29, 1999   (JP) ................................. 11-215012
Jul. 29, 1999   (JP) ................................. 11-215013

(51) Int. Cl.
  *H01P 1/10*   (2006.01)
  *H04B 1/44*   (2006.01)
(52) U.S. Cl. ..................... 333/103; 333/104; 455/83
(58) Field of Classification Search ................ 333/103, 333/104; 455/83
  See application file for complete search history.

(56) References Cited

U.S. PATENT DOCUMENTS 5,054,114 A   10/1991   Erickson ...................... 455/78

(Continued)

FOREIGN PATENT DOCUMENTS

EP   0 641 090   3/1995

(Continued)

OTHER PUBLICATIONS

H. Fukushima et al.; A Study of Saw Antenna Duplexer for Mobile Application Fujitsu Limited, Japan, 1998 IEEE Ultrasonics Symposium; pp. 9-12.

(Continued)

*Primary Examiner*—Barbara Summons
(74) *Attorney, Agent, or Firm*—Keating & Bennett, LLP (57) ABSTRACT

A high frequency switching component for being connected to a transmission circuit, a reception circuit, and an antenna to be used for switching to either a state in which the transmission circuit is connected to the antenna, or a state in which the reception circuit is connected to the antenna, comprising: a multilayer circuit board, on which there is formed a circuit including: a transmission circuit terminal to be connected to the transmission circuit; a reception circuit terminal to be connected to the reception circuit; an antenna terminal to be connected to be the antenna; a ground terminal; a first diode whose anode is connected to the transmission circuit terminal and the cathode thereof is connected to the antenna terminal; a second diode whose anode is connected to the reception circuit terminal and the cathode thereof is connected to the ground terminal; a signal line for connecting the transmission circuit terminal, the reception circuit terminal, and the antenna terminal via the first diode; and an inductor or an LC filter disposed between the signal line and the ground terminal to reduce noise on the signal line; in which the transmission circuit terminal, the reception circuit terminal, the antenna terminal, the ground terminal, the first diode, and the second diode are disposed on a surface of the multilayer circuit board; at least a part of the signal line being disposed inside the multilayer circuit board; and the inductor being disposed either inside or on the surface of the multilayer circuit board.

16 Claims, 4 Drawing Sheets

U.S. PATENT DOCUMENTS

| | | | |
|---|---|---|---|
| 5,473,293 A | 12/1995 | Chigodo et al. | 333/104 |
| 5,499,000 A | 3/1996 | Morikawa et al. | 333/104 |
| 5,513,382 A | 4/1996 | Agahi-Kesheh et al. | 455/83 |
| 5,634,200 A | 5/1997 | Kitakubo et al. | 455/82 |
| 6,289,204 B1 | 9/2001 | Estes et al. | 455/78 |
| 6,731,184 B1 * | 5/2004 | Muto et al. | 333/103 |

FOREIGN PATENT DOCUMENTS

| | | | |
|---|---|---|---|
| EP | 0 778 671 | | 6/1997 |
| JP | 58-125440 | | 8/1983 |
| JP | 62-198727 | | 12/1987 |
| JP | 63-056023 | | 3/1988 |
| JP | 3-32118 | * | 2/1991 ......... 455/83 |
| JP | 4-132751 | | 12/1992 |
| JP | 05-025850 | | 4/1993 |
| JP | 7-202502 | | 8/1995 |
| JP | 08-097743 | | 4/1996 |
| JP | 9-200077 | | 7/1997 |
| JP | 10-126281 | | 5/1998 |

OTHER PUBLICATIONS

Transistor Technology; Special No. 47; pp. 91-95; CQ Publishing K.K.; 1994.

Official Communication issued in the corresponding European Patent Application No. 00115466.5-1246, mailed on Apr. 11, 2006.

* cited by examiner

HIGH FREQUENCY SWITCHING COMPONENT WITH ELECTROSTATIC SURGE ELIMINATION

This application is a Continuation of U.S. patent application Ser. No. 09/603,252 filed Jun. 26, 2000, now U.S. Pat. No. 6,731,184.

BACKGROUND OF THE INVENTION

1. Field of the Invention

The present invention relates to high frequency switching components, and more particularly, the invention relates to high frequency switching components formed by using a multilayer circuit board so as to prevent noise.

2. Related Art

In digital portable phones, high frequency switches are connected to transmission circuits, reception circuits, and antennas to be used for switching connections between the transmission circuits and the antennas, and connections between the reception circuits and the antennas.

For example, Japanese Unexamined Patent Application Publication No. 7-202502 provides a high frequency switching component comprising such a high frequency switch, which is of keen interest to the background of the present invention.

The high frequency switching component is formed by using a multilayer circuit board. Circuit elements forming a high frequency switch are disposed in the multilayer circuit board and on a surface thereof, by which miniaturization of the high frequency switching component is achieved. With this arrangement, an area necessary to mount the high frequency switching component can be reduced.

In a high frequency circuit incorporating such a high frequency switch, it is essential to take measures for reducing noise, including electrostatic surges, that is, surge currents which occur when built-up static electricity is discharged.

In order to prevent such noise, conventionally, a separate noise-preventing component has been mounted on an appropriate wiring board with the high frequency switching component.

However, in such an arrangement, it is necessary to allocate an area for mounting the noise-preventing component on the wiring board. As a result, this arrangement is a hindrance to the miniaturization of the wiring board. In addition, since the noise-preventing component is required to be a discrete component, this causes an increase in cost.

As another conventional noise-preventing measure, a resin coating is applied on an antenna to prevent an electrostatic current surge from entering the antenna.

However, the resin coating can come off due to deterioration of the resin. Under such circumstances, an electrostatic surge can cause great damage to the high-frequency switch, or to an external circuit connected to the antenna or the high-frequency switch, and can lead even to the destruction of the external circuit.

As noise-preventing components, varistors and Zener diodes are known. When a varistor or a Zener diode is used as a component for preventing electrostatic surges, the capacitance between terminals must be increased. Thus, these components cannot be used in a signal line, and accordingly cannot be used for preventing electrostatic surges in a high frequency circuit incorporating such a high frequency switch.

SUMMARY OF THE INVENTION

Accordingly, it is an object of the present invention to provide a high frequency switching component capable of solving the above-described problems.

One embodiment of the present invention provides a high frequency switching component for being connected to a transmission circuit, a reception circuit, and an antenna and having two states, a state in which the transmission circuit is connected to the antenna, and a state in which the reception circuit is connected to the antenna. In addition, the high frequency switching component has a multilayer circuit board.

Linked to the multilayer circuit board, there is formed a circuit used for a high frequency switch including a transmission circuit terminal to be connected to a transmission circuit, a reception circuit terminal to be connected to the reception circuit, an antenna terminal to be connected to be the antenna, a ground terminal, a first diode whose anode is connected to the transmission circuit terminal and whose cathode is connected to the antenna terminal, a second diode whose anode is connected to the reception circuit terminal and whose cathode is connected to the ground terminal, and a signal line for connecting the transmission circuit terminal, the reception circuit terminal, and the antenna terminal via the first diode.

In addition, the transmission circuit terminal, the reception circuit terminal, the antenna terminal, the ground terminal, the first diode, and the second diode are disposed on a surface of the multilayer circuit board. Furthermore, at least a part of the single line is disposed inside the multilayer circuit board.

In such a high frequency switching component, in order to solve the above-described technological problems, the present invention provides a structure in which an inductor is disposed between the signal line and the ground terminal to eliminate noise within or on the surface of the multilayer circuit board.

The above inductor is preferably provided by a line electrode disposed inside the multilayer circuit board.

In addition, in this embodiment of the present invention, particularly, it is preferable that the inductor is disposed between the ground terminal and a part at which the signal line is connected to the antenna terminal.

Further, in such a high frequency switching component, another embodiment of the present invention provides a structure in which an LC filter is disposed on the signal line to eliminate noise, and the LC filter is arranged inside or on the surface of the multilayer circuit board.

The above LC filter is preferably disposed inside the multilayer circuit board.

In addition, in this embodiment of the present invention, particularly, it is preferable that the LC filter is disposed at a part at which the signal line is connected to the antenna terminal.

Other features and advantages of the present invention will become apparent from the following description of the invention which refers to the accompanying drawings.

DETAILED DESCRIPTION OF EMBODIMENTS OF THE INVENTION

Figure 1:
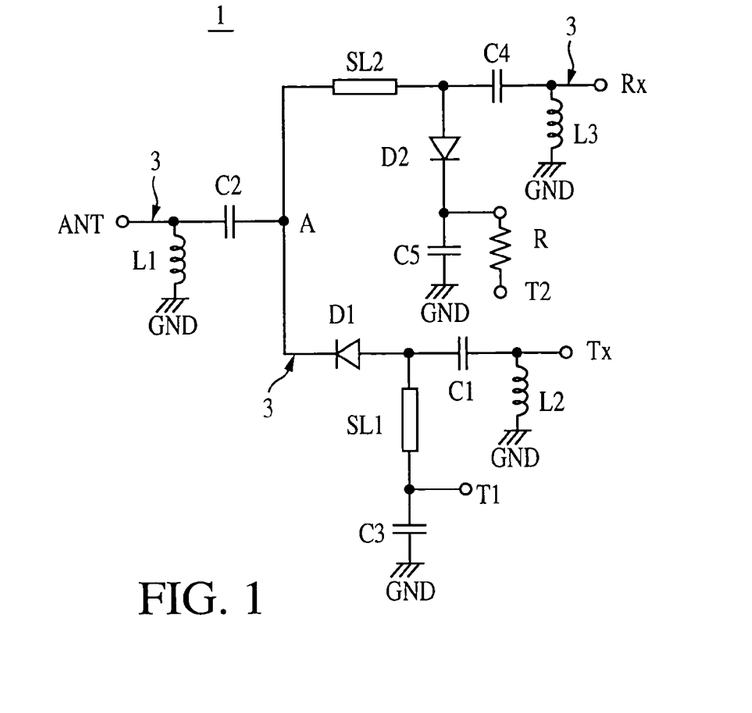
FIG. 1 is the circuit diagram of a circuit structure arranged in a high frequency switching component 1 according to a first embodiment of the present invention.
Figure 2:
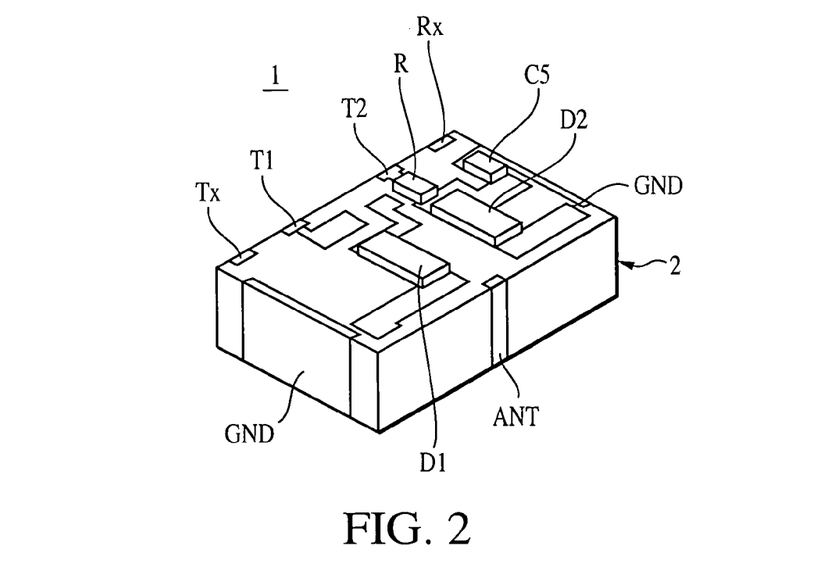
FIG. 2 is a perspective view showing the appearance of the high frequency switching component 1 having the circuit structure shown in FIG. 1.
Figure 3:
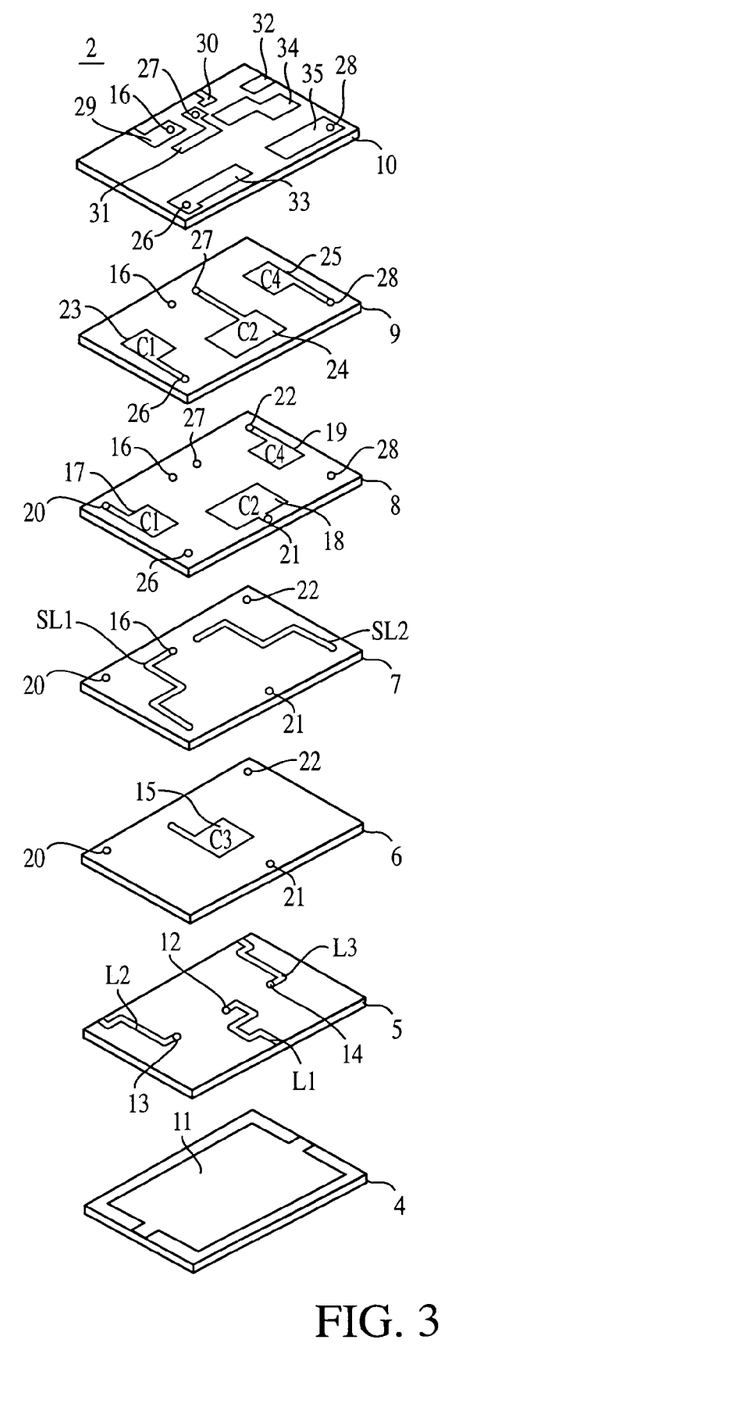
FIG. 3 is an exploded perspective view of the multilayer circuit board 2 shown in FIG. 2.

FIGS. 1 and 3 illustrate a high frequency switching component 1 according to a first embodiment of the present invention.

First, referring to FIG. 1, a description will be given of the structure of a circuit disposed in the high frequency switching component 1.

The high frequency switching component 1 includes a transmission circuit terminal Tx for being connected to a transmission circuit, a reception circuit terminal Rx for being connected to a reception circuit, an antenna terminal ANT for being connected to an antenna, and a ground terminal GND. In addition, the high frequency switching component 1 includes a first control terminal T1 and a second control terminal T2.

The transmission circuit terminal Tx is connected to the anode of a first diode D1 via a first capacitor C1. The cathode of the first diode D1 is connected to the antenna terminal ANT via a second capacitor C2. The anode of the first diode D1 is connected to a ground terminal GND, that is, the anode is grounded, via a series circuit constituted of a first transmission line SL1 and a third capacitor C3. In addition, the first control terminal T1 is connected to an intermediate point between the first transmission line SL1 and the third capacitor C3, and a first control circuit for switching the high frequency switching component 1 is to be connected to the first control terminal T1.

The second capacitor C2 connected to the antenna terminal ANT is connected to the reception circuit terminal Rx via a series circuit constituted of a second transmission line SL2 and a fourth capacitor C4. In addition, the anode of a second diode D2 is connected to the intermediate point between the second transmission line SL2 and the fourth capacitor C4. The cathode of the second diode D2 is connected to a ground terminal GND via a fifth capacitor C5, that is, the cathode thereof is grounded. The second control terminal T2 is connected to the intermediate point between the second diode D2 and the fifth capacitor C5 via a resistor R. A second control circuit for switching the high frequency switching component 1 is to be connected to the second control terminal T2.

In such a high frequency switching component 1, in order to connect the transmission circuit and the antenna in order to perform transmission, a positive voltage is applied to the first control terminal T1 by the first control circuit, which is not shown in the figure. With this applied voltage, both the first and second diodes D1 and D2 are switched on. In this situation, the DC voltage applied to the first control terminal T1 is applied only to a circuit including the first and second diodes D1 and D2, and the voltage is blocked by the first to fifth capacitors C1 to C5.

As described above, when the first and second diodes D1 and D2 are switched on, a signal applied to the transmission circuit terminal Tx by the transmission circuit is transmitted to the antenna via the antenna terminal ANT. In addition, the signal from the transmission circuit is not transmitted to the reception circuit terminal Rx, since the second transmission line SL2 is placed in a resonant condition by being grounded via the second diode D2, and as a result, an extremely large impedance is observed in the direction of the reception circuit terminal Rx from a node A.

On the other hand, in the high frequency switching component 1, in order to connect the reception circuit and the antenna to perform reception, no voltage is applied to the first control terminal T1, and a positive voltage is applied to the second control terminal T2. With this applied voltage, both the first and second diodes D1 and D2 are switched off. As a result, a signal received from the antenna via the antenna terminal ANT is transmitted to the reception circuit via the reception circuit terminal Rx, and is not transmitted to the transmission circuit via the transmission circuit terminal Tx.

In this way, with the high frequency switching component 1, control voltages are applied to the first and second control terminals T1 and T2 so as to switch to a state in which the transmission circuit is connected to the antenna and a state in which the reception circuit is connected to the antenna.

In this embodiment, the high frequency switching component 1 described above also includes the first to third inductors L1 to L3. The inductors L1 to L3 are disposed respectively between the ground terminal GND and the antenna terminal ANT, the transmission circuit terminal Tx, and the reception circuit terminal Rx. With this arrangement, the inductors L1 to L3 serve to eliminate noise such as electrostatic surges occurring on the signal line 3.

More specifically, the first inductor L1 is disposed between the part at which the signal line 3 is connected to the antenna terminal ANT and the ground terminal GND. The second inductor L2 is disposed between the part at which the signal line 3 is connected to the transmission circuit terminal Tx and the ground terminal GND. The third inductor L3 is disposed between the part at which the signal line 3 is connected to the reception circuit terminal Rx and the ground terminal GND.

With the first to third inductors L1 to L3, when a noise component is generated in a signal running through the signal line 3, the noise component flows through one of the inductors L1 to L3 to the ground terminal GND, with the result that the noise component can be eliminated. Particularly, the first inductor L1 disposed near the antenna terminal ANT effectively allows an electrostatic surge that enters from the antenna to flow to the ground terminal GND, and serves to prevent the electrostatic surge from entering either the high frequency switching component 1 or an external circuit connected to the switching component. As a result, the first inductor L1 prevents damage both to the high frequency switching component 1 and to external circuits.

Furthermore, by appropriately selecting the inductance value of each of the first to third inductors L1 to L3, the inductors L1 to L3 are adapted to be suitable for prevention of electrostatic surges, and for the prevention of noise on the low-frequency side, between direct circuit and a signal frequency. In addition, the inductors L1 to L3 can have the additional function of performing matching adjustments in the high frequency switching component 1.

FIG. 2 is a perspective view illustrating the appearance of the high frequency switching component 1 comprising the circuit shown in FIG. 1. FIG. 3 is an exploded perspective view of a multilayer circuit board 2 disposed in the high frequency switching component 1 shown in FIG. 2. In FIGS. 2 and 3, the same reference numerals are given to parts equivalent to those shown in FIG. 1 so that the linkages between FIGS. 1, 2, and 3 can be easily understood.

The multilayer circuit board 2 disposed in the high frequency switching component 1, as shown in FIG. 3, is formed by laminating a plurality of insulation layers 4 to 10. The insulation layers 4 to 10 are formed of a dielectric material.

Referring to FIG. 3, the description of the circuit board 2 will start from the insulation layer 4 at the bottom. Over almost the entire first insulation layer 4, a ground electrode 11 is formed. The ground electrode 11 is connected to the ground terminal GND shown in FIG. 2.

On a second insulation layer 5, first to third inductors L1 to L3 are formed by line electrodes. These line electrodes for forming the first to third inductors L1 to L3 provide microstrip line structures with the ground electrode 11.

An end of each of the line electrodes forming the first to third inductors L1 to L3 is connected to the ground electrode 11 via a respective one of via-holes 12, 13, and 14. The other end of the line electrode forming the first inductor L1 is connected to the antenna terminal ANT shown in FIG. 2. The other end of the line electrode forming the second inductor L2 is connected to the transmission circuit terminal Tx shown in FIG. 2. The other end of the line electrode forming the third inductor L3 is connected to the reception circuit terminal Rx shown in FIG. 2.

On a third insulation layer 6, a capacitor electrode 15 used for a third capacitor C3 is formed. The other capacitor electrode used for the third capacitor C3 is provided by the ground electrode 11.

On a fourth insulation layer 7, line electrodes used for first and second transmission lines SL1 and SL2 are formed. These first and second transmission lines SL1 and SL2 comprise microstrip line structures formed by these line electrodes and the ground electrode 11. An end of the first transmission line SL1 is connected to a capacitor electrode 15 used for the third capacitor C3 through a via-hole 16.

On a fifth insulation layer 8, capacitor electrodes 17, 18, and 19 used for the first, second, and fourth capacitors C1, C2, and C4 are formed. The capacitor electrode 17 used for the first capacitor C1 is connected to the second inductor L2 by a via-hole 20. The capacitor electrode 18 used for the second capacitor C2 is connected to the first inductor L1 by a via-hole 21. The capacitor electrode 19 used for the fourth capacitor C4 is connected to the third inductor L3 by a via-hole 22.

On a sixth insulation layer 9, the other capacitor electrodes 23, 24, and 25 used for the first, second, and fourth capacitors C1, C2, and C4 are formed. These capacitor electrodes 23, 24, and 25 oppose the capacitor electrodes 17, 18, and 19 through the insulation layer 9.

The capacitor electrode 23 used for the first capacitor C1 is connected to the first transmission line SL1 by a via-hole 26. The capacitor electrode 24 used for the second capacitor C2 is connected to one end of the second transmission line SL2 by a via-hole 27. The capacitor electrode 25 used for the fourth capacitor C4 is connected to the other end of the second transmission line SL2 by a via-hole 28.

On a seventh insulation layer 10 at the top are formed conductive lands 29, 30, 31, 32, 33, 34, and 35.

The conductive land 29 is connected to the first control terminal T1 shown in FIG. 2, and is also connected to the first transmission line SL1 and the capacitor electrode 15 used for the third capacitor C3 through the via-hole 16.

The conductive land 30 is connected to the second control terminal T2 shown in FIG. 2.

The conductive land 31 is connected to the capacitor electrode 24 used for the second capacitor C2 and the second transmission line SL2 through the above via-hole 27.

The conductive land 32 is connected to the ground terminal GND shown in FIG. 2.

The conductive land 33 is connected to the capacitor electrode 23 used for the first capacitor C1 and the first transmission line SL1 by the above via-hole 26.

The conductive land 35 is connected to the capacitor electrode 25 used for the fourth capacitor C4 and the second transmission line SL2.

The fifth capacitor C5, the first and second diodes D1 and D2, and the resistor R shown in FIG. 1 are composed of chips. As shown in both FIGS. 2 and 3, the fifth capacitor C5 is mounted in such a manner that the conductive land 32 is linked to the conductive land 34. In addition, the first diode D1 is mounted in such a manner that the conductive land 31 is linked to the conductive land 33. The second diode D2 is mounted in such a manner that the conductive land 34 is linked to the conductive land 35. The resistor R is mounted such that the conductive land 30 is linked to the conductive land 34.

As shown above, the high frequency switching component 1 has the circuit structure shown in FIG. 1. In the high frequency switching component 1, as clearly shown in FIG. 2, on the surface of the multilayer circuit board 2 are formed the transmission circuit terminal Tx, the reception circuit terminal Rx, the antenna terminal ANT, the ground terminal GND, the first diode D1, the second diode D2, the fifth capacitor C5, and the resistor R. In addition, at least a part of the signal line 3 connecting the transmission circuit terminal Tx and the reception circuit terminal Rx to the antenna terminal ANT is disposed inside the multilayer circuit board 2. In addition, the first to third inductors L1 to L3 are provided by the line electrodes disposed inside the multilayer circuit board 2.

As described above, the present invention has been described by referring to the disclosed embodiment. However, other various modifications are applicable without departing from the scope of the invention.

For example, although the above embodiment has provided the first to third inductors L1 to L3 which are formed by the line electrodes disposed in the multilayer circuit board 2, at least one of the first to third inductors L1 to L3 may instead be formed as a chip to be mounted on the surface of the multilayer circuit board 2. Also, chip capacitors can be substituted for the first to fourth capacitors C1 to C4 disposed inside the multilayer circuit board 2. On the other hand, the fifth capacitor C5 and/or the resistor R which are each formed as a chip may instead be disposed inside the multilayer circuit board 2.

Furthermore, in the above embodiment shown in the figures, each of the first to third inductors L1 to L3 is arranged corresponding to a respective one of the antenna terminal ANT, the transmission circuit terminal Tx, and the reception circuit terminal Rx. However, one or more of the three inductors L1 to L3 may be omitted.

As described above, according to the above described structure and arrangement, since inductors used for eliminating noise are disposed between the signal line and the ground terminal in the high frequency switching component, noise components contained in high frequency signals on the signal line can be carried to the ground terminal via the inductors. As a result, noise such as electrostatic surges can be reduced, and, for example, damage caused by the electrostatic surges to the high frequency circuit can effectively be reduced.

Furthermore, since such inductors used for eliminating noise are arranged either on the surface of the multilayer circuit board or inside the multilayer circuit board included in the high frequency switching component, the mounting of these inductors does not increase the area necessary to mount the high frequency switching component. Furthermore, when compared with a case in which an additional noise-preventing component is used, it is possible to decrease the area occupied on a wiring board by a high frequency circuit including the high frequency switching component, and production cost can also be reduced.

In the present invention, miniaturization of the high frequency switching component can be achieved by using the line electrodes as the inductors for eliminating noise on lines disposed in the multilayer circuit board.

Furthermore, in the invention, since the inductor is disposed between the ground terminal and the part at which the signal line is connected to the antenna terminal, the inductor effectively works against electrostatic surges entering from an antenna. Therefore, damage caused by electrostatic surges to the high frequency switch and other circuits can be reduced.

Figure 4:
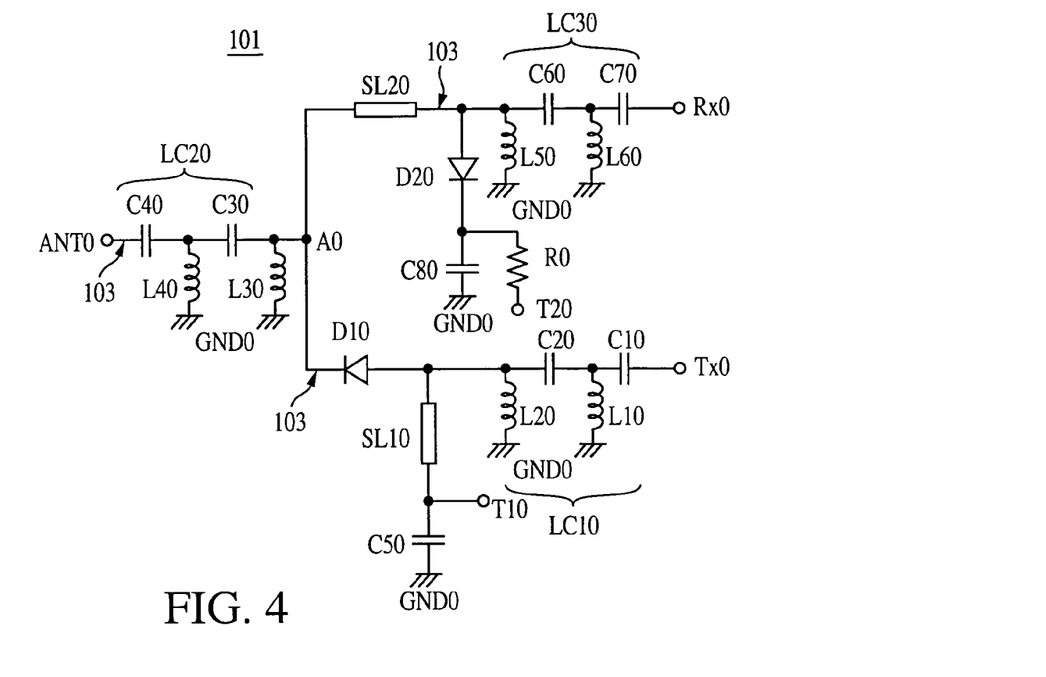
FIG. 4 is a circuit diagram showing a circuit structure arranged in a high frequency switching component 101 according to a second embodiment of the present invention.
Figure 5:
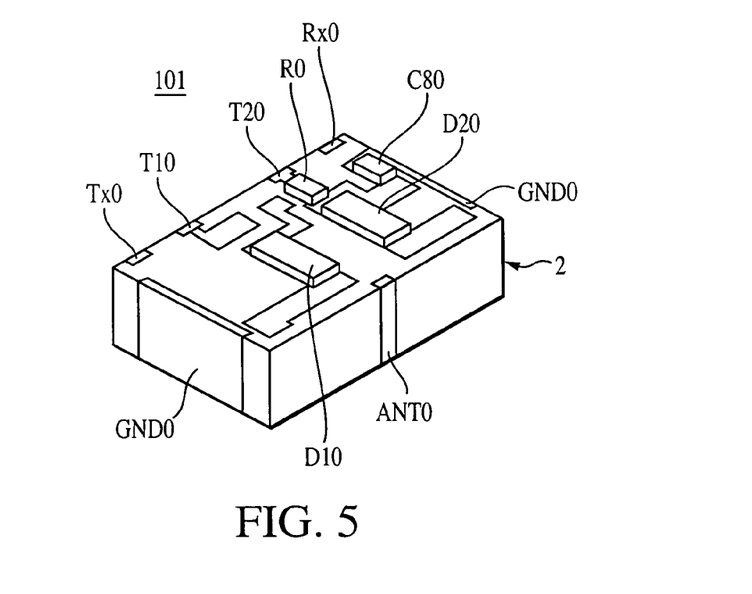
FIG. 5 is a perspective view showing the appearance of the high frequency switching component 101 having the circuit structure shown in FIG. 4.
Figure 6:
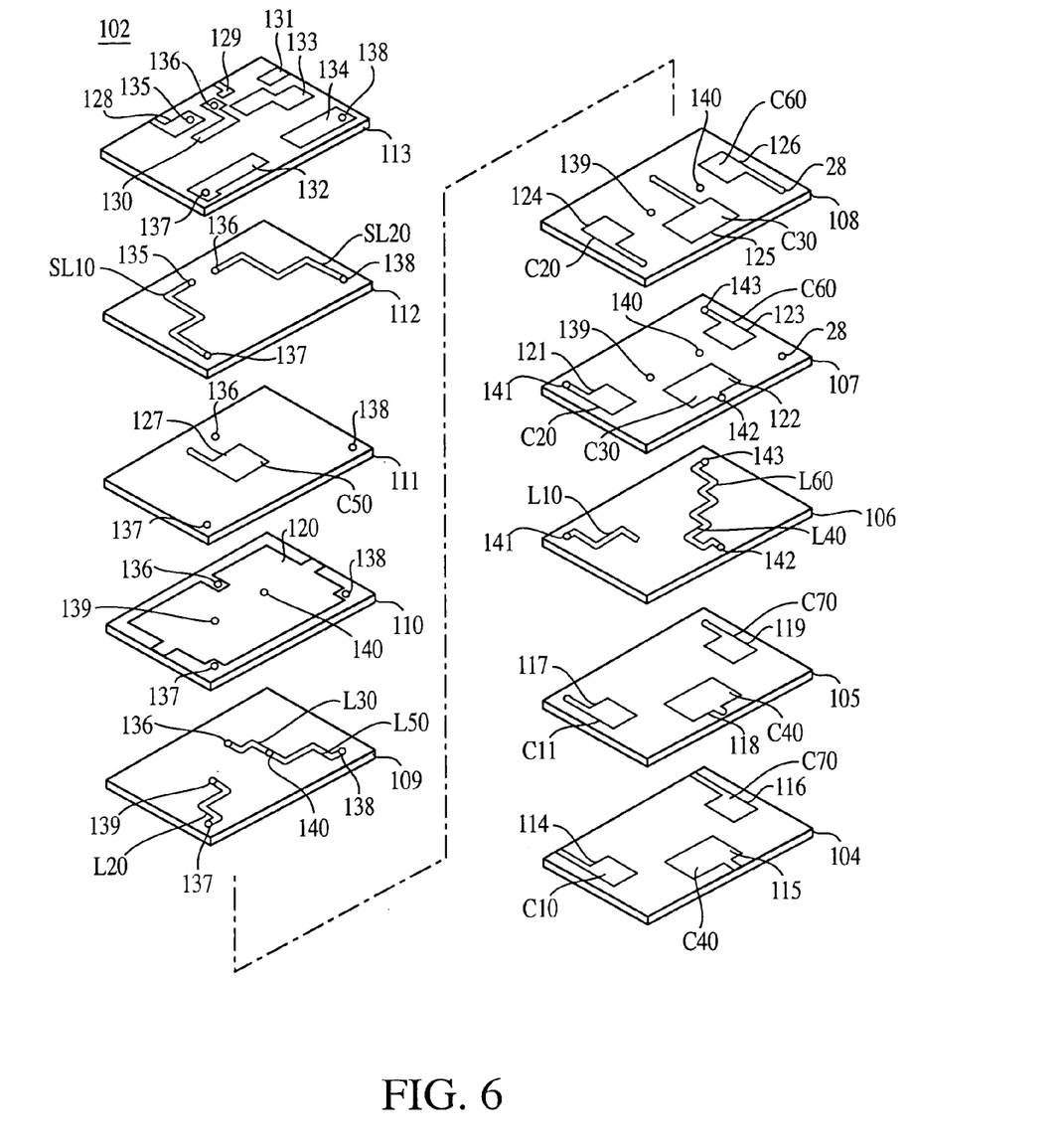
FIG. 6 is an exploded perspective view of a multilayer circuit board 102 shown in FIG. 5.

FIGS. 4 to 6 illustrate a high frequency switching component 101 according to a second embodiment of the present invention.

First, referring to FIG. 4, a description will be given of the structure of a circuit disposed in the high frequency switching component 101.

The high frequency switching component 101 includes a transmission circuit terminal Tx0 for being connected to a transmission circuit, a reception circuit terminal Rx0 for being connected to a reception circuit, an antenna terminal ANT0 for being connected to an antenna, and a ground terminal GND0. In addition, the high frequency switching component 101 includes a first control terminal T10 and a second control terminal T20.

The transmission circuit terminal Tx0 is connected to the anode of a first diode D10 via a first capacitor C10 and a second capacitor C20 connected in series. The cathode of the first diode D10 is connected to the antenna terminal ANT0 via a third capacitor C30 and a fourth capacitor C40 connected in series.

The anode of the first diode D10 is connected to a ground terminal GND0, that is, the anode is grounded, via a series circuit constituted of a first transmission line SL10 and a fifth capacitor C50. In addition, the first control terminal T10 is connected to the intermediate point between the first transmission line SL10 and the fifth capacitor C50, and a control circuit connected to the first control terminal T10 can be used to control switching performed by the high frequency switching component 101.

The reception circuit terminal Rx0 is connected to the third capacitor C30 and the fourth capacitor C40 connected to the antenna terminal ANT0 via a series circuit constituted of a second transmission line SL20 and the sixth and seventh capacitors C60 and C70.

In addition, the anode of a second diode D20 is connected to the intermediate point between the second transmission line SL20 and the sixth capacitor C60. The cathode of the second diode D20 is connected to a ground terminal GND0 via an eighth capacitor C80, that is, the cathode thereof is grounded. The second control terminal T20 is connected to the intermediate point between the second diode D20 and the eighth capacitor C80 via a resistor R0. Another control circuit, connected to the second control terminal T20, can be used to control switching performed by the high frequency switching component 101.

In such a high frequency switching component 101, for connecting the transmission circuit and the antenna to perform transmission, a positive voltage is applied to the first control terminal T10 from the control circuit, which is not shown in the figure. With this applied voltage, both the first and second diodes D10 and D20 are switched on. In this situation, since the DC voltage is blocked by the first to eighth capacitors C10 to C80, the voltage applied to the first control terminal T10 is applied only to a circuit including the first and second diodes D10 and D20.

As described above, when the first and second diodes D10 and D20 are switched on, a signal applied to the transmission circuit terminal Tx by the transmission circuit is transmitted to the antenna via the antenna terminal ANT0. In addition, the signal from the transmission circuit is not transmitted to the reception circuit terminal Rx0, since the second transmission line SL20 is placed in a resonant state by being grounded via the second diode D20, and as a result, an impedance observed in the direction of the reception circuit terminal Rx0 from a connecting point A0 is extremely high.

Meanwhile, in the high frequency switching component 101, in order to connect the reception circuit and the antenna to perform reception, no voltage is applied to the first control terminal T10, and a positive voltage is applied to the second control terminal T20. With this applied voltage, both the first and second diodes D10 and D20 are switched off. As a result, a signal received from the antenna via the antenna terminal ANT0 is transmitted to the reception circuit via the reception circuit terminal Rx0. Further, the received signal is not transmitted to the transmission circuit via the transmission circuit terminal Tx0.

In this way, with the use of the high frequency switching component 101, the voltage applied to each of the first and second control terminals T10 and T20 is controlled so as to switch to either a state in which the transmission circuit is connected to the antenna, or a state in which the reception circuit is connected to the antenna.

In the high frequency switching component 101 described above, according to this embodiment, the first to sixth inductors L10 to L60 are disposed in such a manner that the LC filters LCl0, LC20, and LC30 are formed by using both the inductors L10 to L60 and the aforementioned first, second, third, fourth, sixth, and seventh capacitors C10, C20, C30, C40, C60, and C70 together. The LC filters LC10, LC20, and LC30 each form a fourth-order high pass filter.

The first LC filter LC10 is formed by the first and second capacitors Cl0 and C20, and the first and second inductors L10 and L20, which are disposed between the signal line 103 passing through the capacitors C10 and C20 and the ground terminal GND0.

The second LC filter LC20 is formed by the third and fourth capacitors C30 and C40, and the third and fourth inductors L30 and L40, which are disposed between the signal line 103 passing through the capacitors C30 and C40 and the ground terminal GND0.

The third LC filter LC30 is formed by the sixth and seventh capacitors C60 and C70, and the fifth and sixth inductors L50 and L60, which are disposed between the signal line 103 passing through the capacitors C60 and C70 and the ground terminal GND0.

As described above, since these LC filters LC10 to LC30 form high pass filters, these LC filters effectively serve to eliminate noise components of frequencies lower than a signal frequency on the signal line 103, such as electrostatic surges.

Particularly, the second LC filter LC20 disposed near the antenna terminal ANT0 effectively allows an electrostatic surge which enters from the antenna to be attenuated, and serves to prevent the electrostatic surge from entering either into the high frequency switching component 101 or into external circuits attached to the switching component. As a result, the second LC filter LC20 prevents damage both to the high frequency switching component 101 and to external circuits.

Furthermore, the LC filters LC10 to LC30 can be adapted to have the additional function of performing matching adjustments between the transmission circuit terminal Tx0, the reception circuit terminal Rx0, and the antenna terminal ANT0 in the high frequency switching component 101.

FIG. 5 is a perspective view illustrating the appearance of the high frequency switching component 101 comprising the circuit shown in FIG. 4. FIG. 6 is an exploded perspective view of a multilayer circuit board 102 disposed in the high frequency switching component 101 shown in FIG. 5. In FIGS. 5 and 6, the same reference numerals are given to parts equivalent to those shown in FIG. 4 so that the linkages between FIGS. 4, 5 and 6 can be easily understood.

The multilayer circuit board 102 disposed in the high frequency switching component 101, as shown in FIG. 6, is formed by laminating a plurality of insulation layers 104 to 113. The insulation layers 104 to 113 are, for example, formed of dielectric materials.

Referring to FIG. 6, the description will start from the insulation layer 104 at the bottom. On the first insulation layer 104, capacitor electrodes 114, 115, and 116 for first, fourth, and seventh capacitors C10, C40, and C70 are formed. The capacitor electrode 114 for the first capacitor C10 is connected to the transmission circuit terminal Tx0 shown in FIG. 5. The capacitor electrode 115 for the fourth capacitor C40 is connected to the antenna terminal ANT0 shown in FIG. 5. The capacitor electrode 116 for the seventh capacitor C70 is connected to the reception circuit terminal Rx0 shown in FIG. 5.

On a second insulation layer 105, other capacitor electrodes 117, 118, and 119 for the first, fourth, and seventh capacitors C10, C40, and C70 are formed. These capacitor electrodes 117, 118, and 119 oppose the capacitor electrodes 114, 115, and 116 described above through the insulation layer 105.

On a third insulation layer 106, first, fourth, and sixth inductors L1, L40, and L60 are formed by line electrodes. The line electrodes for forming the first, fourth, and sixth inductors L1, L40, and L60 provide microstrip line structures with a ground electrode 120, which will be described below. In addition, the fourth and sixth inductors L40 and L60 are provided by a series of the line electrodes.

On a fourth insulation layer 107 are formed capacitor electrodes 121, 122, and 123 for second, third, and sixth capacitors C20, C30, and C60.

On a fifth insulation layer 108 are formed other capacitor electrodes 124, 125, and 126 for the second, third, and sixth capacitors C20, C30, and C60. These capacitor electrodes 124, 125, and 126 oppose the aforementioned capacitor electrodes 121, 122, and 123 via the insulation layer 108.

On a sixth insulation layer 109, second, third, and fifth inductors L20, L30, and L50 are formed by line electrodes. These line electrodes for forming the second, third, and fifth inductors L20, L30, and L50 provide microstrip line structures with the ground electrode 120, which will be described below. In addition, the third and fifth inductors L30 and L50 are provided by a series of the line electrodes.

On almost the entire seventh insulation layer 110, the ground electrode 120 is formed. The ground electrode 120 is connected to the ground terminal GND0 shown in FIG. 5.

On an eighth insulation layer 111 is formed a capacitor electrode 127 for the fifth capacitor C50. The other capacitor electrode for the fifth capacitor C50 is provided by the aforementioned ground electrode 120.

On a ninth insulation layer 112, line electrodes for first and second transmission lines SL10 and SL20 are formed. These first and second transmission lines SL10 and SL20 comprise microstrip line structures formed by their line electrodes and the ground electrode 120.

On a tenth insulation layer 112 at the top are formed conductive lands 128, 129, 130, 131, 132, 133, and 134. The conductive land 128 is connected to the first control terminal T10 shown in FIG. 5. The conductive land 129 is connected to the second control terminal T20 shown in FIG. 5. The conductive land 131 is connected to the ground terminal GND0 shown in FIG. 5.

In addition, a description will be given of the connection between the insulation layers 104 to 113. The conductive land 128, the first transmission line SL10, and the capacitor electrode 127 for the fifth capacitor C50 are connected to one another through a via-hole 135.

The conductive land 130, the second transmission line SL20, the inductor L30, and the capacitor electrode 125 for the third capacitor C30 are connected to one another through a via-hole 136.

The conductive land 132, the first transmission line SL10, the second inductor L20, and the capacitor 124 for the second capacitor C20 are connected to one another through a via-hole 137.

The conductive land 134, the second transmission line SL20, the fifth inductor L50, and the capacitor electrode 126 for the sixth capacitor C60 are connected to one another through a via-hole 138.

The first inductor L10 and the second inductor L20 are connected to the ground electrode 120 through a via-hole 139. The third, fourth, fifth, and sixth inductors L30, L40, L50, and L60 are connected to the ground electrode 120 through a via-hole 140.

The capacitor electrode 121 for the second capacitor C20, the first inductor L10, and the capacitor electrode 117 for the first capacitor C10 are connected to one another through a via-hole 141.

The capacitor electrode 122 for the third capacitor C30, the fourth inductor L40, and the capacitor electrode 118 for the fourth capacitor C40 are connected to one another through a via-hole 142.

The capacitor electrode 123 for the sixth capacitor C60, the sixth inductor L60, and the capacitor electrode 119 for the seventh capacitor C70 are connected to one another through a via-hole 143.

The eighth capacitor C80, the first and second diodes D10 and D20, and the resistor R0 shown in FIG. 4 are formed of chips. As seen in FIGS. 5 and 6, the eighth capacitor C80 is mounted such that the conductive land 131 is linked to the conductive land 133. In addition, the first diode D10 is mounted such that the conductive land 130 is linked to the conductive land 132. The second diode D20 is mounted such that the conductive land 133 is linked to the conductive land 134. The resistor R0 is mounted such that the conductive land 129 is linked to the conductive land 133.

In this way, the high frequency switching component 101 provides a circuit structure shown in FIG. 4. In the high frequency switching component 101, as clearly shown in FIG. 5, the transmission circuit terminal Tx0, the reception circuit terminal Rx0, the antenna terminal ANT0, the ground terminal GND0, the first diode D10, the second diode D20, the eighth capacitor C80, and the resistor R0 are disposed on the surface of the multilayer circuit board 102. In addition, at least a part of the signal line 103 for connecting the transmission circuit terminal Tx0 and the reception circuit terminal Rx0 to the antenna terminal ANT0 is disposed inside the multilayer circuit board 102. Furthermore, the first to third LC filters LC10 to LC30 provided by the inductors L10 to L60 and the capacitors C10 to C40, C60 and C70, respectively, are disposed inside the multilayer circuit board 102.

Although the invention has been described by referring to the disclosed embodiment, various modifications can be applied within the scope of the present invention.

For example, in the embodiment shown in the figures, the first to third LC filters LC10 to LC30 are provided by the inductors L10 to L60, and the capacitors C10 to C40, C60 and C70. However, at least one of the LC filters LC10 to LC30 may be formed by a chip filter component. Alternatively, at least one of the inductors and the capacitors forming at least one of the LC filters LC10 to LC30 may be formed as a chip to be mounted on the surface of the multilayer circuit board 102. The same is true of the fifth capacitor C50 disposed inside the multilayer circuit board 102. On the other hand, the resistor R0 formed as a chip component may instead be disposed inside the multilayer circuit board 102.

Furthermore, in the embodiment shown in the figures, the first to third LC filters LC10 to LC30 are connected respectively to the antenna terminal ANT0, the transmission circuit terminal Tx0, and the reception circuit terminal Rx0. However, one or more of the three LC filters LC10 to LC30 may be omitted.

In addition, in the embodiment shown in the figures, the LC filters LC10 to LC30 form fourth-order high pass filters. However, regardless of what order filter they are, according to the frequency of the noise to be eliminated, low pass filters or band pass filters may be used instead.

As described above, according to the above described structure and arrangement, since LC filters for eliminating noise are connected to the signal line in the high frequency switching component, a noise component contained in a high frequency signal on the signal line can be eliminated via the LC filters. As a result, for example, noise such as an electrostatic surge can be reduced, and damage caused by the electrostatic surge to the high frequency circuit can be effectively reduced. In order to enhance such a noise-eliminating effect, it is only necessary to increase the number of stages in the LC filter.

In addition, since the noise-eliminating LC filters are disposed inside or on the surface of the multilayer circuit board arranged in the high frequency switching component, they do not increase the area required to mount the high frequency switching component. Furthermore, when compared with a case in which a separate noise-preventing component is added, the area of the wiring board required for mounting a high frequency circuit including the high frequency switching component can be made smaller, and the cost of production can also be reduced.

In addition, when the inductor is inserted between the signal line and the ground to prevent noise, the smaller the inductance value, the greater the noise-eliminating effect. However, in contrast, since the insertion loss becomes greater, negative effects are caused on the characteristics of the high frequency circuit. However, as in the case of the present invention, with the use of the LC filters, even though the inductance value is smaller, it is easy to obtain matching. As a result, with no problem to decrease the inductance value, the noise-eliminating effects can be enhanced.

Furthermore, since the LC filters also can function as matching adjustment circuits, matching adjustment circuits are unnecessary or can be simplified. With this arrangement, reduction of the mounting area and the cost can be achieved.

In this invention, since the LC filters for eliminating a noise are disposed inside the multilayer circuit board, the high frequency switching component can be miniaturized.

Additionally, in the present invention, since the LC filter is inserted at the part at which the signal line is connected to the antenna terminal, the LC filter effectively serves against an electrostatic surge entering from the antenna. As a result, damage caused by such an electrostatic surge to the high frequency switch can be reduced, and damage to external circuits attached thereto.

While the invention has been particularly shown and described with reference to preferred embodiments thereof, it will be understood by those skilled in the art that the foregoing and other changes in form and details may be made therein without departing from the spirit of the invention.

What is claimed is:

1. A high frequency switching component for being connected to a transmission circuit, a reception circuit, and an antenna, the high frequency switching component comprising:
    a multilayer circuit board including a plurality of insulative layers;
    a high frequency switch including an inductor, a capacitor and a diode for switching either to a state in which the transmission circuit is connected to the antenna or a state in which the reception circuit is connected to the antenna;
    a plurality of terminals including a transmission circuit terminal to be connected to the transmission circuit, a reception circuit terminal to be connected to the reception circuit, an antenna terminal to be connected to the antenna, and a ground terminal, each of the transmission circuit terminal, the reception circuit terminal, the antenna terminal and the ground terminal being disposed on a surface of the multilayer circuit board;
    a first inductor for eliminating an electrostatic surge provided between the reception circuit terminal and a capacitor provided adjacent to the reception circuit terminal; and
    a second inductor for eliminating an electrostatic surge provided between the transmission circuit terminal and a capacitor provided adjacent to the transmission circuit terminal.

2. The high frequency switching component according to claim 1, further comprising a third inductor for eliminating an electrostatic surge being provided between the antenna terminal and a capacitor provided adjacent to the antenna terminal.

3. The high frequency switching component according to claim 2, wherein the third inductor is connected to the ground terminal.

4. The high frequency switching component according to claim 1, wherein the first inductor is connected to the ground terminal.

5. The high frequency switching component according to claim 1, wherein the second inductor is connected to the ground terminal.

6. A high frequency switching component for being connected to a transmission circuit, a reception circuit, and an antenna, the high frequency switching component comprising:
- a multilayer circuit board including a plurality of insulative layers;
- a high frequency switch including an inductor, a capacitor and a diode for switching either to a state in which the transmission circuit is connected to the antenna or a state in which the reception circuit is connected to the antenna;
- a plurality of terminals including a transmission circuit terminal to be connected to the transmission circuit, a reception circuit terminal to be connected to the reception circuit, an antenna terminal to be connected to the antenna, and a ground terminal, each of the transmission circuit terminal, the reception circuit terminal, the antenna terminal and the ground terminal being disposed on a surface of the multilayer circuit board; and
- a first LC filter for eliminating an electrostatic surge provided between the reception circuit terminal and the high frequency switch provided adjacent to the reception circuit terminal; and
- a second LC filter for eliminating an electrostatic surge provided between the transmission circuit terminal and the high frequency switch provided adjacent to the transmission circuit terminal.

7. The high frequency switching component according to claim 6, further comprising a third LC filter for eliminating an electrostatic surge provided adjacent to the antenna terminal.

8. The high frequency switching component according to claim 7, wherein the third LC filter is connected to the ground terminal.

9. The high frequency switching component according to claim 6, wherein the first LC filter is connected to the ground terminal.

10. The high frequency switching component according to claim 6, wherein the second LC filter is connected to the ground terminal.

11. A high frequency switching component for being connected to a transmission circuit, a reception circuit, and an antenna, the high frequency switching component comprising:
- a multilayer circuit board including a plurality of insulative layers;
- a high frequency switch including an inductor, a capacitor and a diode for switching either to a state in which the transmission circuit is connected to the antenna or a state in which the reception circuit is connected to the antenna;
- a plurality of terminals including a transmission circuit terminal to be connected to the transmission circuit, a reception circuit terminal to be connected to the reception circuit, an antenna terminal to be connected to the antenna, and a ground terminal, each of the transmission circuit terminal, the reception circuit terminal, the antenna terminal and the ground terminal being disposed on a surface of the multilayer circuit board;
- at least one first inductor for eliminating an electrostatic surge provided between the antenna terminal and a capacitor provided adjacent to the antenna terminal; and
- at least one second inductor for eliminating an electrostatic surge provided between the transmission circuit terminal and a capacitor provided adjacent to the transmission circuit terminal.

12. The high frequency switching component according to claim 11, wherein at least one of the first and second inductors is connected to the ground terminal.

13. A high frequency switching component for being connected to a transmission circuit, a reception circuit, and an antenna, the high frequency switching component comprising:
- a multilayer circuit board including a plurality of insulative layers;
- a high frequency switch including an inductor, a capacitor and a diode for switching either to a state in which the transmission circuit is connected to the antenna or a state in which the reception circuit is connected to the antenna;
- a plurality of terminals including a transmission circuit terminal to be connected to the transmission circuit, a reception circuit terminal to be connected to the reception circuit, an antenna terminal to be connected to the antenna, and a ground terminal, each of the transmission circuit terminal, the reception circuit terminal, the antenna terminal and the ground terminal being disposed on a surface of the multilayer circuit board;
- an LC filter for eliminating an electrostatic surge provided between the antenna terminal and the high frequency switch provided adjacent to the antenna terminal; and
- at least one inductor for eliminating an electrostatic surge provided between the transmission circuit terminal and a capacitor provided adjacent to the transmission circuit terminal.

14. The high frequency switching component according to claim 13, wherein at least one of the LC filter and the at least one inductor is connected to the ground terminal.

15. A high frequency switching component for being connected to a transmission circuit, a reception circuit, and an antenna, the high frequency switching component comprising:
- a multilayer circuit board including a plurality of insulative layers;
- a high frequency switch including an inductor, a capacitor and a diode for switching either to a state in which the transmission circuit is connected to the antenna or a state in which the reception circuit is connected to the antenna;
- a plurality of terminals including a transmission circuit terminal to be connected to the transmission circuit, a reception circuit terminal to be connected to the reception circuit, an antenna terminal to be connected to the antenna, and a ground terminal, each of the transmission circuit terminal, the reception circuit terminal, the antenna terminal and the ground terminal being disposed on a surface of the multilayer circuit board; and
- an LC filter for eliminating an electrostatic surge provided between the reception circuit terminal and the high frequency switch provided adjacent to the reception circuit terminal;
- at least one inductor for eliminating an electrostatic surge provided between the transmission circuit terminal and a capacitor provided adjacent to the transmission circuit terminal.

16. The high frequency switching component according to claim 15, wherein at least one of the LC filter and the at least one inductor is connected to the ground terminal.

* * * * *